US009805296B2

(12) United States Patent
Loy et al.

(10) Patent No.: US 9,805,296 B2
(45) Date of Patent: Oct. 31, 2017

(54) METHOD AND APPARATUS FOR DECODING OR GENERATING MULTI-LAYER COLOR QR CODE, METHOD FOR RECOMMENDING SETTING PARAMETERS IN GENERATION OF MULTI-LAYER QR CODE, AND PRODUCT COMPRISING MULTI-LAYER COLOR QR CODE (71) Applicant: The Chinese University of Hong Kong, Hong Kong (CN)

(72) Inventors: Chen Change Loy, Hong Kong (CN); Wing Cheong Lau, Hong Kong (CN); Zhibo Yang, Hong Kong (CN); Zhiyi Cheng, Luoding (CN); Chak Man Li, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 0 days.

(21) Appl. No.: 15/051,354

(22) Filed: Feb. 23, 2016

(65) Prior Publication Data
US 2017/0243097 A1 Aug. 24, 2017

(51) Int. Cl.
*G06K 19/06* (2006.01)
*G06K 7/12* (2006.01)
(52) U.S. Cl.
CPC ........... *G06K 19/0614* (2013.01); *G06K 7/12* (2013.01); *G06K 19/06037* (2013.01)
(58) Field of Classification Search
CPC .. G06K 7/12; G06K 2019/06225; G06K 7/14; G06K 7/10851; G06K 7/1443; G06K 19/06037; G06K 7/1417; G06K 7/10722
(Continued)

(56) References Cited

U.S. PATENT DOCUMENTS 6,298,176 B2 * 10/2001 Longacre, Jr. ..... G06K 7/10722
382/312
7,516,899 B2 * 4/2009 Laser ...................... G06K 7/12
235/454
(Continued)

FOREIGN PATENT DOCUMENTS

| CN | 104778435 | 7/2015 |
| EP | 1 916 619 | 5/2011 |
| WO | WO 2008/075898 | 6/2008 |

OTHER PUBLICATIONS

Bagherinia et al.; "A Theory of Color Barcodes"; IEEE International Conference on Computer Vision Workshops; 2011; 8 pages.
(Continued)

*Primary Examiner* — Karl D Frech
(74) *Attorney, Agent, or Firm* — Fish & Richardson P.C.

(57) ABSTRACT

The present invention discloses a system and a method for decoding QR codes in complex scenes, a system and a method for generating multi-layer color QR codes and applications enabled by the systems and methods. The method for decoding a QR code may include detecting rough locations of the QR code by a learning-based QR code detector which is pre-trained off-line; localizing finder patterns and alignment patterns within each detected location; correcting geometric distortion of each QR code, based on the localized finder patterns and alignment patterns; restoring a color of each data module within each corrected QR code by a learning-based classifier; and decoding the QR code from each restored QR code. The application also discloses a system and a method to determine the optimal setting parameters for creating a multi-layer QR code to fulfill the user's requirements. Some applications enabled by these systems and methods are also disclosed.

29 Claims, 7 Drawing Sheets (58) Field of Classification Search
USPC .............. 235/462.04, 462.08, 462.09, 462.1, 235/462.11
See application file for complete search history.

(56) References Cited

U.S. PATENT DOCUMENTS

| | | |
|---|---|---|
| 8,047,447 B2 | 11/2011 | Bulan et al. |
| 8,864,033 B2 | 10/2014 | Tian et al. |
| 8,879,832 B2 | 11/2014 | Dalal et al. |
| 9,111,186 B2 | 8/2015 | Blasinski et al. |
| 2007/0278303 A1 | 12/2007 | Cattrone |

OTHER PUBLICATIONS

Blasinski, et al.; "Per-Colorant-Channel Color Barcodes for Mobile Applications: An Interference Cancellation Framework"; IEEE Transactions on Image Processing; vol. 22, No. 4; Apr. 4, 2013; 14 pages.

Grillo et al.; "High Capacity Colored Two Dimensional Codes"; IEEE Proceedings of the International Multiconference on Computer Science and Information Technology; vol. 5; 2010; pp. 709-716.

Kato et al.; "Novel Colour Selection Scheme for 2D Barcode"; IEEE International Symposium on Intelligent Signal Processing and Communication Systems; Dec. 7-9, 2009; 4 pages.

Kieseberg et al.; "QR Code Security"; MoMM 2010 Proceedings; 6 pages.

Parekh et al.; "Localization and Segmentation of A 2D Capacity Color Barcode"; Applications of Computer Vision, IEEE Workshop; Jan. 7-9, 2008.

Querini et al.; "Color Classifiers for 2D Color Barcodes"; IEEE Proceedings of the 2013 Federated Conference on Computer Science and Information Systems; pp. 611-618.

Shimizu et al.; "Color Recognition by Extended Color Space Method for 64-color 2-D Barcode"; MVA 2011 IAPR Conference on Machine Vision Applications; Jun. 13-15, 2011; 4 pages.

Srivastava et al.; "Bayesian Quadratic Discriminant Analysis"; Journal of Machine Learning Research 8 (2007) pp. 1277-1305.

\* cited by examiner

METHOD AND APPARATUS FOR DECODING OR GENERATING MULTI-LAYER COLOR QR CODE, METHOD FOR RECOMMENDING SETTING PARAMETERS IN GENERATION OF MULTI-LAYER QR CODE, AND PRODUCT COMPRISING MULTI-LAYER COLOR QR CODE

TECHNICAL FIELD

The present application relates to the technical field of image recognition. More particularly, the present application relates to a system and a method for generating multi-layer color QR codes, a system and a method for decoding color QR codes in complex scenes, a method for recommending feasible setting parameters in generation of a multi-layer QR code from a predetermined set of setting parameters, and some applications enabled by these systems and methods.

BACKGROUND OF THE APPLICATION

A barcode is a type of optical machine-readable data representation and designed for enabling machines to read the product information automatically. Quick Respond (QR) code as a kind of barcode has gained the most popularity because of its quick response to scanning, high capacity in data encoding, robustness to damage and readability from any directions.

Currently QR code usually only encodes Uniform Resource Locators (URLs). However, it requires on-line web services and a dataset deployed on a remote server and requires the Internet access for those devices. In addition, since the data is transmitted behind the scene, it may expose users to malicious attacks and cause private information leakage without users' awareness.

There is therefore a need for a practical approach to address at least one of the above-mentioned problems.

SUMMARY OF THE APPLICATION

With the system and method for generating color QR code provided in the present application, all the user data can be stored in the QR code instead of in a web page URL. The user data includes, not limited to, text, voice and photo, etc.

With the system and method for decoding QR codes provided in the present application, user data from the QR codes in complex scenes can be extracted rapidly and robustly, thereby increasing the decoding success rate and reducing latency in real scanning. The present application on one hand seeks to optimize the decoding algorithm for high-density QR codes to afford robust and fast decoding by mobile devices, and on the other hand to leverage color to increase the data capacity of traditional QR codes.

One aspect of the present application discloses a method for decoding a QR code, both the traditional one and the multi-layer one, in complex scenes. The method may include detecting rough locations of the QR code using a learning-based QR code detector; localizing finder patterns and alignment patterns within each detected location; correcting geometric distortion of each QR code, based on the localized finder patterns and alignment patterns; restoring (recovering), by a learning-based classifier, a color of each data module within each corrected QR code; and decoding the QR code from each restored QR code.

Another aspect of the present application discloses a method to recover color of the QR codes using combinations of color classifiers and a method to build such classifiers. Another aspect of the present application discloses an apparatus for decoding a QR code in complex scenes. The apparatus may include detecting means for detecting rough locations of the QR code using a learning-based QR code detector; localizing means for localizing finder patterns and alignment patterns within each detected location; correcting means for correcting geometric distortion of each QR code, based on the localized finder patterns and alignment patterns; restoring means for restoring a color of each data module within each corrected QR code by a learning-based classifier and decoding means for decoding the QR code from each restored QR code.

Another aspect of the present application discloses a system for decoding a QR code in complex scenes. The system may include a processor and a memory storing computer-readable instructions which when executed by the processor, cause the processor to detect rough locations of the QR code using a learning-based QR code detector; localize finder patterns and alignment patterns within each detected location; correct geometric distortion of each QR code, based on the localized finder patterns and alignment patterns; restore the color of each data module within each corrected QR code by using a learning-based classifier and decode the QR code from the restored QR code Another aspect of the present application discloses a non-volatile computer storage medium for decoding a QR code, storing computer-readable instructions which when executed by a processor, cause the processor to detect rough locations of the QR code using a learning-based QR code detector; localize finder patterns and alignment patterns within each detected location; correct geometric distortion of each QR code, based on the localized finder patterns and alignment patterns; restore the color of each data module within each corrected QR code by using a learning-based classifier and decode the QR code from the restored QR code.

Yet another aspect of the present application discloses a method for generating a multi-layer color QR code from data to be encoded. The method may include partitioning the data to be encoded into data blocks; encoding the partitioned data blocks into a plurality of monochrome QR codes independently, wherein each monochrome QR code has a same dimension; shuffling the data block inside each monochrome QR code in a bit-by-bit manner to improve decoding robustness; and concatenating the encoded monochrome QR codes to generate the multi-layer color QR code.

Yet another aspect of the present application discloses an apparatus for encoding a multi-layer color QR code. The apparatus may include a partitioning means for partitioning the data to be encoded into data blocks; an encoding means for encoding the partitioned data blocks into a plurality of monochrome QR codes independently, wherein each monochrome QR code has a same dimension; and a concatenating means for concatenating the encoded monochrome QR codes to generate the multi-layer color QR code.

Yet another aspect of the present application discloses a system for encoding a multi-layer color QR code. The system may include a processor and a memory storing computer-readable instructions which when executed by the processor, cause the processor to partition the data to be encoded into data blocks; encode the partitioned data blocks into a plurality of monochrome QR codes independently, wherein each monochrome QR code has a same dimension; and concatenate the encoded monochrome QR codes to generate the multi-layer color QR code.

Yet another aspect of the present application discloses a system to determine optimal settings to create a multi-layer QR code under certain conditions. The optimal setting includes at least the number of layers, error correction of each layer, printout size limit of the code and printer resolution. The conditions may involve the content size of the code to create, limit to printout size, printer resolutions and a typical scanning condition.

Yet another aspect of the present application discloses a method to improve decoding accuracy of a monochrome QR code while keeping its compatibility to be scanned by other scanners in prior arts. The method involves adding new special patterns to the code without hiding up those in the current monochrome QR code standard.

Yet another aspect of the present application discloses a method to accumulate the partial scanning results from multiple unsuccessful scanning in order to fill-in the data not read in a particular scanning. The method involves combining and storing the results from multiple unsuccessful scanning, locating the missing data in a particular scanning in terms of data block, as well as filling-in the gaps by stored blocks.

An aspect of the present application discloses some applications/products enabled by the above-mentioned systems and methods, including, not limited to CQR-Shirts, CQR-Assistant, CQR Eye, and CQR-BinaryCode. In any of these products, one or multiple high capacity QR codes can be scanned simultaneously and a scanner is not pointed to any particular QR codes when reading the information (aim-free manner).

An aspect of the present application discloses a cloth (CQR-Shirts), such as a vest, pants, a jacket and a T-shirt with a multi-layer color QR code encrypted with information of interests and generated according to one of the method of generating a color QR code of the present application, wherein the information may be protected by a single password or multiple passwords, in which case people with different passwords can get different information from the same code. An obvious example application is a dating game. Each participant has a QR code on their shirt for others to scan. By providing different passwords to others, a participant can control what kind of information is given to other participants via the QR code. One or multiple high capacity QR codes are scanned aim-free simultaneously. It also allows people with memory impairment to show their information, like home address, via a QR code on their shirt. Authorized parties like police can get private information, e.g. ID card number, from the same QR code. The CQR-Shirts can apply in mass event like marathon so that people can identify the event staff by scanning the QR codes on their vests and event staffs can perform registrations by reading QR codes of individual runners from a crowd photo. With crowd photos in different places, event staff can also track the progress of each runner and prevent violations like substitution and running short cuts.

The CQR-Shirts can also work as a data card on the cloth of people with memory impairment. In this setting, people suffering from memory impairment bring important information by simply putting on their cloths. When they get lost, people around can help them find a way home or contact their relatives by scanning the color QR code. Authorized parties like doctors and police can also read the encrypted private information, e.g. allergy record, from the code to provide proper assistance.

The multi-layer color QR codes in the above-mentioned application can be decoded in batch according to one of the multi-layer color QR codes decoding method in the present application. This application allows interested parties to take a wide shot of a crowd of event participants and read the information of each participant from their multi-layer color QR codes on T-shirts. The decoding algorithm in the present application also allows decoding multi-layer color QR codes on the curved and not-so-clean surfaces like T-shirts and drug bags. In scenarios like marathon races, this allows event organizers to authenticate and track individual participants without checking the participants one-by-one.

Still an aspect of the present application discloses a color QR code Assistant (CQR-Assistant) that provides pill-taking information in multimedia like voice and/or scalable text by a color QR code, wherein the QR code can be attached on a drug bag and generated according to one of the method of generating a color QR code of the present application. People not able to read text on the drug bag can still get the pill-taking information and drug information by viewing the multimedia shown on their Smartphone after scanning the color QR code. The CQR-Assistant also makes use of robust geometric transformation to perform object recognitions. In this product, when an object like drug is putted on the QR code on drug bag and scanned, the scanner algorithm will detect the finder and alignment patterns on the QR code and hence perform a robust geometric transformation. With the transformation, the image of the object is also transformed to create an elevation drawing. This elevation drawing provides enough information to recognize the object from a database and hence the information of the object in the database is shown to users. For example, this product can recognize what type of the drug is putted on the QR code, and allow patients to check whether the drugs are correct before taking.

Besides, the geometric distortion correcting step in the QR code decoding can be leveraged to help identifying an object like drug. By putting an object like drug on a QR code, the scanner algorithm can make use of the geometric transformation matrix calculated from the QR code to correct the geometric distortion and create an elevation drawing of the object. The elevation drawing provides enough information to recognize the object from a database. For example, recognizing what type of the drug is putted on the QR code. This allows patients to check whether the drugs are correct before taking. It works even when a phone is not pointing directing to the drug and background QR code.

An aspect of the present application discloses a color QR code Eye (CQR-Eye) that gathers information including visual information regarding nearby objects and delivers the information via non-visual channels, wherein the QR code is generated according to one of the method of generating a color QR code of the present application. The QR codes may be attached on a surface of different physical objects (e.g., building, toilet, road, bench, etc.) and can be scanned in an aim-free manner. Herein, the "aim-free manner" means the scanner application can scan the QR codes even if users cannot point the applications to the codes. In the QR codes, data are not forgeable because of digital protections like digital signature. This application allows people to know about the surrounding area (by scanning the multi-layer QR codes) without using their eyes or aiming any devices to a particular place. This application also provides "information filters", which can be set by the users and filter out uninterested information in the QR codes by using tags embedded in the QR codes.

An aspect of the present application discloses a high capacity multi-layer color QR code (CQR-BinaryCode) that delivers binary data via non-digital medium by using multi-layer color QR codes, wherein the binary data can be private, forgery-protected and/or encrypted and the QR code is generated according to one of the method of generating a color QR code of the present application.

BRIEF DESCRIPTION OF THE DRAWING

Other features, objects and advantages of the present application will become more apparent from a reading of the detailed description of the non-limiting embodiments, said description being given in relation to the accompanying drawings, among which.

DETAILED DESCRIPTION

The present application will be further described in detail in conjunction with the accompanying drawings and embodiments. It should be understood that the specific embodiments described herein are provided to illustrate the present invention, instead of limiting the present invention. It also should be noted that only parts related to the present invention are shown in the figures for convenience of description.

It should be noted that, the embodiments of the present application and the features in the present application, on a non-conflict basis, may be combined with each other. The present application will be further described in details below in conjunction with the accompanying drawings and embodiments.

Figure 1:
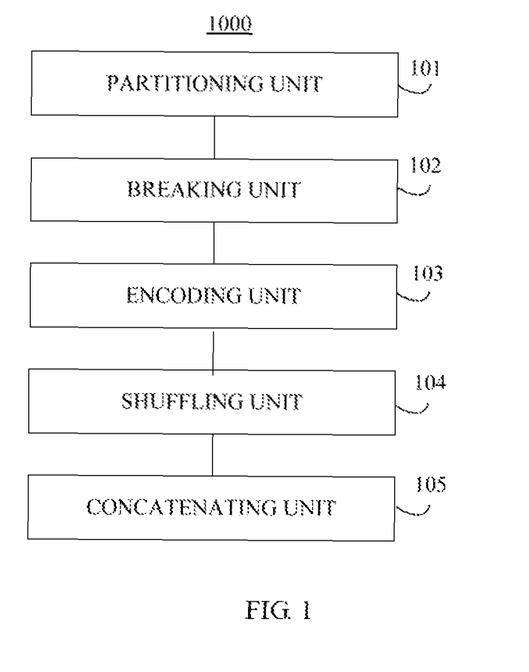
FIG. 1 illustrates a schematic block diagram of a system for generating a multi-layer color QR code according to an embodiment of the present application.
Figure 2:
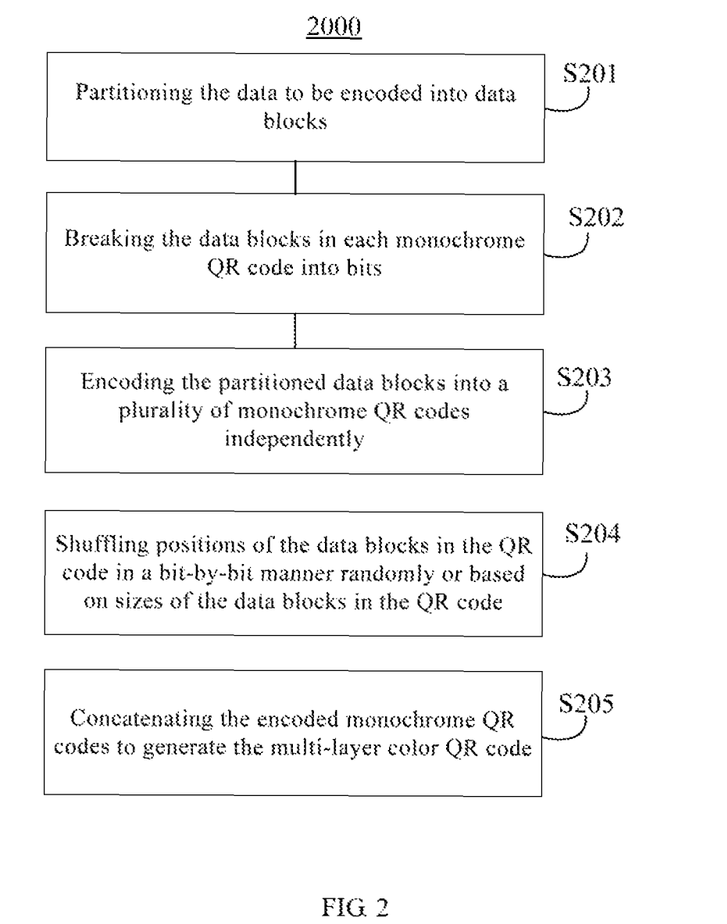
FIG. 2 illustrates an exemplary flow chart of a method for generating a multi-layer color QR code according to an embodiment of the present application.

FIGS. 1 and 2 illustrate an exemplary system 1000 for generating a multi-layer color QR code and an exemplary method 2000 for generating a multi-layer color QR code according to an embodiment of the present application, respectively. A color QR code can be generated by combining multiple monochrome QR codes together in a layered manner and using a set of highly discriminative colors to represent different combinations of binary data modules from the monochrome QR codes Hereinafter, in the color QR code, each monochrome QR code is denoted as a layer, a small square is referred to as a data module and the number of data modules along one side of the square grid is referred to as dimension of the QR code, which for example ranges from 21 to 177.

Referring to FIG. 1, the system 1000 may include a partitioning unit 101, a breaking unit 102, an encoding unit 103, a shuffling unit 104 and a concatenating unit 105. The partitioning unit 101 may partition data to be encoded into a plurality of data blocks. The breaking unit 102 may break the data blocks in each monochrome QR code into bits. The encoding unit 103 may encode the partitioned data blocks into a plurality of monochrome (black/white) QR codes independently, wherein each of the monochrome QR codes has the same dimension. The shuffling unit 104 may shuffle the positions of the data blocks in the QR code in a bit-by-bit manner randomly or based on the sizes of the data blocks in the QR code. The concatenating unit 105 may concatenate the encoded monochrome QR codes to generate the multi-layer color QR code.

Different layers of monochrome QR codes can have different levels of error correction. In order to take advantages of the traditional QR code, the monochrome QR codes have the same dimension.

For n monochrome QR codes, $M_1, M_2, \ldots, M_n$, each Mi, where $i=1, 2, \ldots, n$, is composed of the same number of black or white data modules which represent 0 or 1 in the data bits. The j-th module of $M_i$ is denoted as $m_j^i$. An n-layer color QR code (denoted by $C^n$) is generated by concatenating all $M_i$ from $M_1$ to $M_n$. The j-th module of $C^n$ is denoted as $c_j^n = \{m_j^1, m_j^2, \ldots, m_j^n\}$, wherein $m_j^i$ is binary.

Referring to FIG. 2, the method 2000 may include steps S201 to S205. At step S201, the partitioning unit 101 may partition the data to be encoded into data blocks. At step S202, the data blocks in each monochrome QR code are broken into bits. At step S203, the partitioned data blocks are encoded into a plurality of monochrome QR codes independently, wherein each monochrome QR code has the same dimension. At step S204, positions of the data blocks in the QR code are shuffled in a bit-by-bit manner randomly or based on sizes of the data blocks in the QR code. Then, at step S205, the encoded monochrome QR codes are concatenated to generate the multi-layer color QR code.

In an embodiment of the present application, the method 2000 may further include painting all finder patterns and alignment patterns into different colors according to a predefined color codebook of $2^n$ colors, especially when the code to be generated has more than one layer (i.e. color code). With $2^n$ different colors, the capacity of the generated n-layer color QR code is increased by n−1 times compared with the traditional monochrome QR code of the same dimension. When n=1, the color QR code degrades to the monochrome QR code, and each module carries one bit of (binary) data.

The finder and alignment patterns are needed for determining the boundary and orientation of the color QR code. In an embodiment of the present application, the alignment patterns may be added with color constraints to reduce false positive in the detection of alignment patterns during decoding process.

In an exemplary embodiment, the alignment patterns along the diagonal and anti-diagonal of the monochrome QR code may be enlarged except the bottom-right one, especially when the code to be created has only one layer (i.e. monochrome code). Finder patterns are the special-designed square patterns on the top-left, top-right and bottom-left corners of a QR code. They are used as indicators of whether a QR code is present and its location if present. Finder patterns facilitate QR code detections. Alignment patterns are distributed across the QR code to provide local references in data extractions.

The bottom-right alignment pattern is kept so that it is still decodable by scanner in prior art. An enlarged QR code is added above that pattern instead. By detecting the enlarged patterns, the localizing errors can be reduced and hence the decoding accuracy can be improved. During decoding, when calculating the geometric transformation matrix, errors in localizing the alignment patterns produce huge errors to estimate the matrix. This is also a major obstacle in scanning monochrome QR codes with high data-density. This problem can be solved by using the above methods, thereby improving decoding accuracy of a monochrome QR code while keeping its compatibility to be scanned by other scanners in prior arts.

Figure 3:
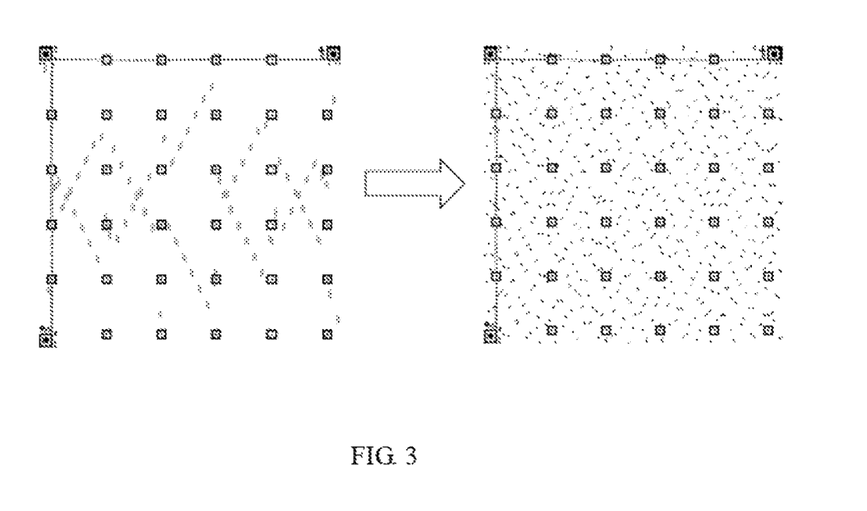
FIG. 3 illustrates spatial randomization of data bits in each data block according to an embodiment of the present application.

In an embodiment of the present application, the method 2000 further includes distributing positions of data bits in each monochrome QR code instead of grouping data bits belonging to the same byte in one spatial region in the existing method. The distribution may be performed based on the dimension of the QR code or done randomly. This spatial shuffling feature aims to solve a problem in decoding high-density QR code. The data of each block may be shuffled bit-by-bit into the whole matrix uniformly, called randomization, to improve the probability of successful correction of each block, as shown in FIG. 3. For QR codes with a high dimension value, data from the same data block may be concentrated in some places on the QR code (as shown in the left part of FIG. 3). In this case, even a small bursty error may introduce an unrecoverable damage to the data of a single data block. This is enough to make the whole data extraction process fail. Spatial shuffling makes sure the data bit of each data block are distributed evenly on the QR code (as shown in the right part of FIG. 3), in order to scatters damages from bursty errors to all data blocks. This substantially reduces the choices of decoding failure on a single data block, increases the decoding robustness.

Figure 7:
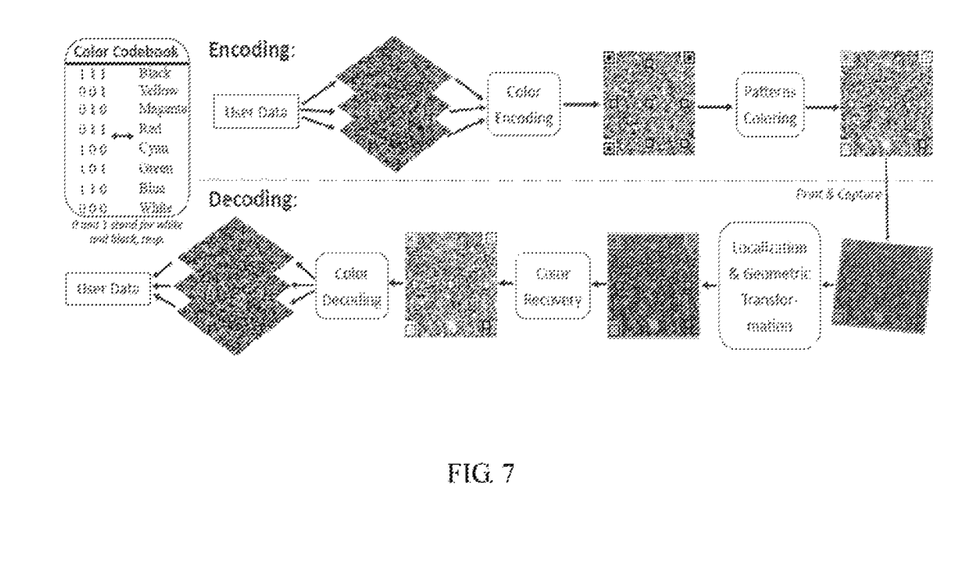
FIG. 7 illustrates a schematic overview of encoding and decoding an exemplary QR code according to an embodiment of the present application.

The construction of an exemplary 3-layer color QR code is illustrated in FIG. 7. With the color QR codes generated according to the present application, more flexibility are provided in generating the QR code in terms of data capacity, embedded error correction level and appearance (color), etc. It is note that although a 3-layer QR code is shown in FIG. 7, the number of layers of the color QR code is not limited to three.

An exemplary method for determining the optimal settings to create a multi-layer QR code will be discussed. With different requirements on data size, for example QR code printout size limit, printing resolutions and typical lighting condition, multi-layer QR codes with different parameters, which include the number of layers, error correction level for each layer, QR code printout size limit and printing resolutions, should be created to minimize the expected scanning time when scanning the code. For example, our experimental results show that, in one 3-layer color QR code, the QR code in the $3^{rd}$ layer should have a higher error-correction level as it has much higher error rate in scanning (compare to the first two layers). If the printout size can be above certain limit, monochrome or 2-layer QR code with high data density is preferred than a 3-layer one with low data density.

In an embodiment of the present application, optimal settings for generating a multi-layer color QR code under different requirements may be determined. The method accepts a vector of requirements as input. Based on a set of feasible setting vectors $\Omega$, $x^i=(x_1^i, x_2^i, x_3^i, x_4^i, x_5^i, \ldots) \in \Omega$, where $i=1, \ldots n$, and n is the number of setting parameters in $\Omega$. Here i is the index of the vector in the dataset, if there are n vectors in the dataset, i will be an integer from 1 to n. Here, $x_1^i, x_2^i, x_3^i, x_4^i$, and $x_5^i$ represent the feasible data size, the feasible limit printout size, the feasible printing resolution, the feasible lighting condition, and the scanning time, respectively; and $x_k^i$, k=6, . . . j represents the number of layers in the QR code, error correction of each layers or a decoding time. The method formulates and solves optimization problems for a setting vector under which decoding time of the color QR code is minimized. The calculated vector is returned as the method output.

In an exemplary embodiment, the vector of requirements (m) includes but not limited to data size $m_1$, limit printout size of the code $m_2$, printer resolution $m_3$ and a typical lighting condition $m_4$ (for example, indoor, outdoor, shadow or fluorescent). The setting vector $x^i$ has the coordinates of requirement vector) $(x_1^i x_2^i x_3^i x_4^i)$, and also includes but not limited to the scanning time $x_5^i$, number of layer and error correction level for each layer. It is noted that, the four requirement vectors are described herein for a purpose of illustration, and the present application is not limited to four requirement vectors.

In an embodiment, when solving the optimization problem, the method first solves the following optimization to find a setting vector $x^i$ from the set $\Omega$.

$$\minimize_i \quad x_5^i$$
$$subjec\ to \quad x^i \in \Omega$$
$$x_1^i \geq m_1$$
$$x_2^i \leq m_2$$
$$x_3^i = m_3$$
$$x_4^i = m_4$$

If no solution is found, the method provides a suggested setting vector, which may not be optimal in decoding time, by solving another optimization problem:

$$\minimize_i \quad D(x^i, m) + \lambda x_5^i$$
$$subjec\ to \quad x^i \in \Omega$$
$$x_1^i \geq m_1$$

where $D(x,m)$ is a function defined as follows:

$$D(x,m):=\alpha_1 \max(0, x_2-m_2) + \alpha_2 1_{x_3=m_3} + \alpha_3 1_{x_4=m_4},$$

where $1_p=1$ if p is true, $1_p=0$ otherwise, $\alpha_1$, $\alpha_2$, and $\alpha_3$ represent weights on different dimension; and $\lambda$ represents the weight of scanning time when determining a feasible setting parameter.

If both optimizations cannot provide a solution, the data size of the input vector is larger than that of any vector in the data set. A dummy vector indicating it is not possible to create a multi-layer QR code with such amount of data will return.

In an embodiment, $\Omega$ (set of feasible setting vectors) is shown in the following table:

| Data size (bytes) | Limit printout size (mm * mm) | Printing resolution (dpi) | Lighting conditions | Scanning time (sec) | ID | Number of layers | Error correction level |
|---|---|---|---|---|---|---|---|
| 800 | 3 * 3 | 600 | Shadow | 8 | 1 | 1 | Q |
| 1000 | 2 * 2 | 600 | Indoor | 5 | 2 | 2 | LL |
| 2300 | 2 * 2 | 1200 | Indoor | 4 | 3 | 3 | LLM |
| 4000 | 2.5 * 2.5 | 1200 | Outdoor | 14 | 4 | 3 | LLL |
| 7700 | 5 * 5 | 900 | Fluorescent | 11 | 5 | 3 | LLM |

In an embodiment, the input of the method is as follows:

| Data size (bytes) | Limit of printout size (mm*mm) | Printing resolution (dpi) | Lighting conditions |
|---|---|---|---|
| 1500 | 1*1 | 600 | Indoor |

And the corresponding output is as follows:

| Data size (bytes) | Limit printout size (mm * mm) | Printing resolution (dpi) | Lighting conditions | Scanning time (sec) | Number of layers | Error correction level |
|---|---|---|---|---|---|---|
| 2300 | 2 * 2 | 1200 | Indoor | 4 | 3 | LLM |

In an exemplary embodiment, partial scanning results from multiple unsuccessful scanning may be combined in order to fill-in the data not read in a particular scanning. In the prior arts, each QR code scanning is independent. When scanning high-density QR codes, no matter monochrome or color, some data is retrieved even in unsuccessful scanning. Therefore, the decoding algorithm disclosed in this application has a feature to collect and store the extracted data from each unsuccessful scanning. The data is organized in terms of data blocks. When an unsuccessful scanning is done, the missed data blocks are identified and searched from the stored content. If all the missing data blocks are filled, a complete data extraction result is constructed and returned. Otherwise, the data blocks in the unsuccessful scanning will be combined with the stored data blocks and next round scanning will start.

Hereinafter, an exemplary system and method for decoding at least one QR code will be described with references to FIGS. 4 and 5. As an example, overviews of decoding at least one QR code and decoding one 3-layer color QR code are illustrated in FIGS. 6 and 7, respectively. With the system and method for decoding the QR codes, the user data can be extracted from the QR codes in complex scenes (for example, color QR codes are attached on clothes of a moving crowd) rapidly and robustly.

Figure 4:
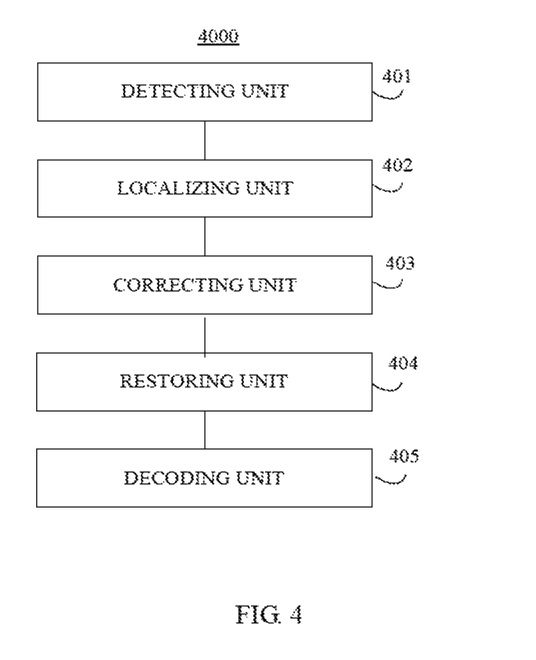
FIG. 4 illustrates a schematic block diagram of an apparatus for decoding at least one QR code according to an embodiment of the present application.
Figure 5:
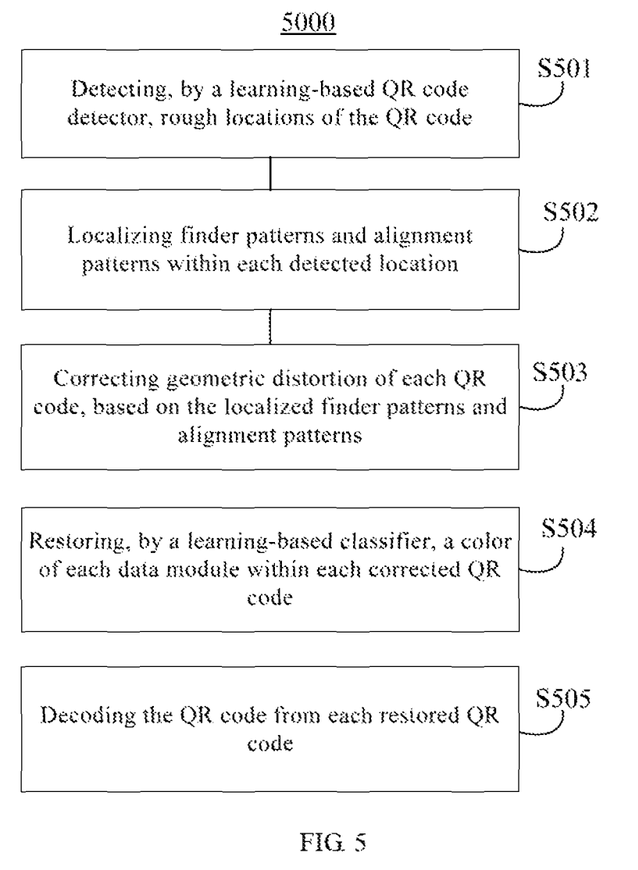
FIG. 5 illustrates an exemplary flow chart of a method for decoding at least one QR code according to an embodiment of the present application.
Figure 6:
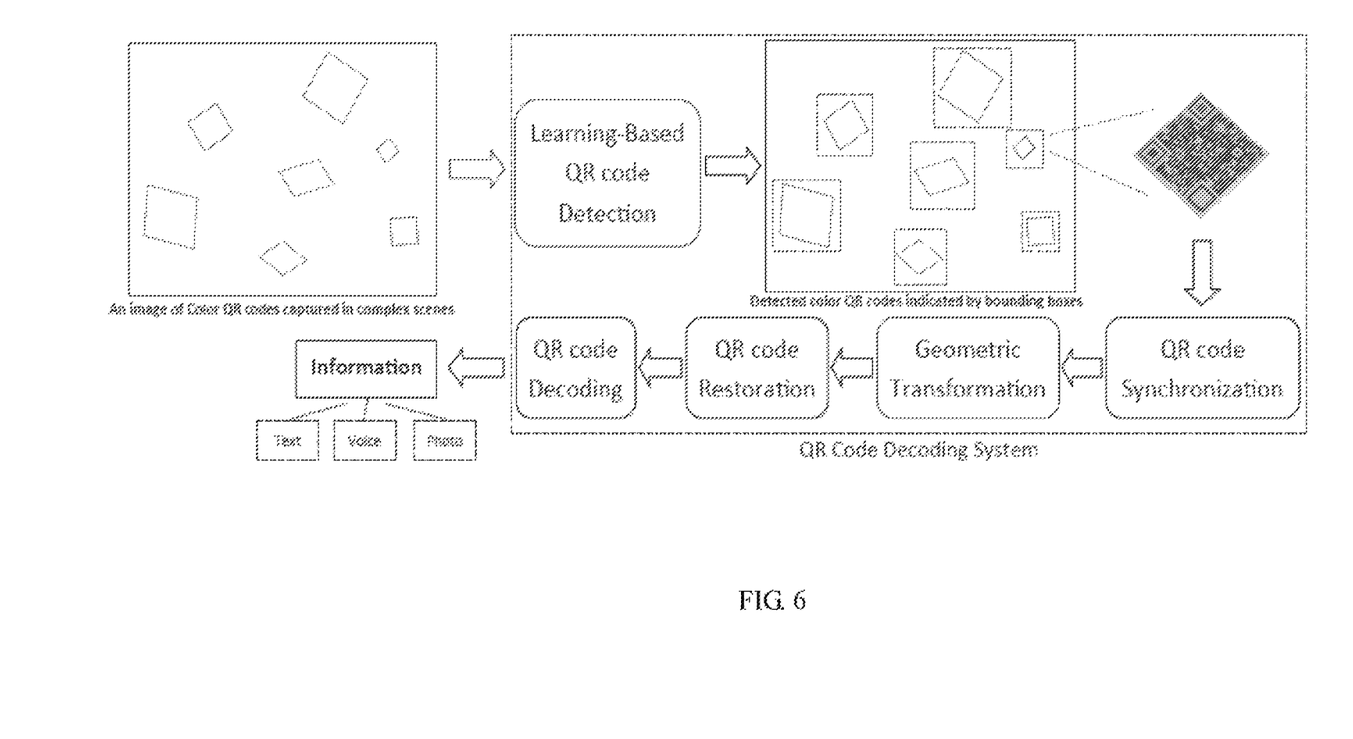
FIG. 6 illustrates a schematic overview of decoding at least one QR code according to an embodiment of the present application.

With reference to FIGS. 4 and 5, an exemplary system 4000 and an exemplary method 5000 for decoding at least one QR code according to an embodiment of the present application will be described.

Referring to FIG. 4, the system 4000 may include a detecting unit 401, a localizing unit 402, a correcting unit 403, a restoring unit 404 and a decoding unit 405. The detecting unit 401 may detect rough locations (e.g., the bounding box shown in FIG. 6) of the QR codes using a learning-based QR code detector. The localizing unit 402 may localize finder patterns and alignment patterns within the detected locations. The correcting unit 403 may correct geometric distortion of each of the QR codes, based on the localized finder patterns and alignment patterns. The restoring unit 404 may restore the color of each data module within each corrected QR code by using a learning-based classifier. The decoding unit 405 may to decode the QR codes from each of the restored QR codes. The QR code detector and the classifier may be pre-trained based on at least one dataset off-line. In an embodiment, the system may further include a training unit (not shown) for training different classifiers for each layer independently. During a series of scanning, each classifier in different layers can works independently, and stops running once its corresponding layer is successfully decoded.

In an embodiment, the localizing unit 402 may check if the locations of all the localized alignment patterns comply with color constraints. If yes, the correcting unit 403 may perform a robust geometric transformation based on the alignment patterns and the finder patterns to estimate a geometric transformation matrix and determine the corrected QR code from the estimated geometric transformation matrix.

In another embodiment, the system may include a checking unit (not shown) for checking whether the QR code is a monochrome code based on color information randomly sampled from the QR code. The localizing unit 402 may localize the alignment patterns along a diagonal and an anti-diagonal of the QR code except for a bottom-right one and localize an enlarged alignment pattern on a top of the bottom-right alignment pattern in order to perform a robust geometric transformation on the QR code. The checking unit may check whether the QR code is a multi-layer color code based on color information randomly sampled from the QR code. The restoring unit 404 may restore the color for each layer of the QR code by using one independent classifier, wherein the classifier is selected depending on at least previous scanning results, camera hardware, a number of layers in the QR codes and lighting conditions.

Referring to FIG. 5, the method 5000 for decoding at least one QR code may include steps S501 to S505. At step S501, rough locations of the QR code may be detected using a learning-based QR code detector. At step S502, finder patterns and alignment patterns within each detected location may be localized. Based on the localized finder patterns and alignment patterns, the geometric distortion of each QR code is corrected at step S503. At step S504, the color of each data module within each corrected QR code may be restored by a learning-based classifier. This step is a crucial step in the method of decoding the color QR code. Since the color in the captured image varies a lot due to different lighting conditions, an off-line learned color classifier (QDA) is used in an embodiment to restore (recover) the color in the QR codes. Then, at step S505, the QR codes can be decoded from the restored QR codes.

Particularly, rough locations (e.g., the bounding box shown in FIG. 6) of the QR codes are detected by using a learning-based QR code detector. The detector may be pre-trained offline. The QR code detector may be configured with a sliding window feature extraction algorithm. In an embodiment of the present application, the QR codes may be retrieved from an image (such as a photo) having many monochrome/color QR codes which can be captured by a cellphone camera. In an embodiment of the present application, the color QR codes are compose of a plurality of square modules with $2^n$ number of colors and all data modules in the color QR codes are randomly shuffled to increase the decoding success rate. In an embodiment of the present application, at least one QR code may be scanned aim-free simultaneously. It is noted that at the detection stage, there may be false positives here, namely, in some of the locations there may be no QR code. In an embodiment, the sliding window feature extraction algorithm may be implemented as follow. Given a captured image, the detection algorithm first creates copies of the image in different predefined scales (e.g., 0.5, 1, 1.5). Secondly, the algorithm uses a window (rectangle) with fixed size to extract a patch of the image. By sliding the window over each copy of the image sequentially, the algorithm obtains multiple patches of the images. Thirdly, within each patch, a predefined set of features may be extracted using feature extraction tools like SIFT and Gabor, or extractors built using techniques in feature learning and deep learning. Lastly, a binary SVM may be applied on the extracted features in order to predict the presence of the QR code in the corresponding patch. The SVM is pre-trained offline to determine if a QR code exists in an image based on the predefined set of features. If the binary SVM indicates there is a QR code in a patch, the patch will be saved as a bounding box (detected region) of a QR code for localizations. In an embodiment, this method works much faster and more accurate than actually scanning the window by the localization method. The sliding distance of the window is smaller than the window size (i.e. the patches are overlapping), so that for each QR code on the image, there will be at least one window covering the whole QR code.

Then, the localizing unit 402 performs a fine search in each of the detected rough locations to localize the finder patterns and alignment patterns within each detected location. A binarization process may be performed on each detected bounding box to further localize the finder patterns and alignment patterns within each location.

In an embodiment, I denotes an image of the color QR code formatted in the RGB color space and is divided equally into 8×8 blocks, wherein $I_i$ denotes the i-th channel of the image I, i∈{R, G, B}. In each block, a threshold is computed for each channel as follows:

$$T_i = \frac{\max(I_i) + \min(I_i)}{2} \quad (1)$$

For any i∈{R, G, B}, a pixel denoted by a triplet ($P_R$, $P_G$, $P_B$) is assigned 1 (black), if Pi<Ti; otherwise, assigned 0 (white). From this, each detected bounding box is binarized to further localize all the color QR codes.

In an embodiment of the present application, color constraints have been added to the patterns for the color QR codes, wherein a specific color is painted for each pattern in the encoding phase. Therefore, the detecting unit may check whether the color of the detected position is correct, thereby significantly reducing the false positive rate of the alignment pattern detection.

Based on the detected finder and alignment patterns, the correcting unit 403 may correct the geometric distortion of each QR code. In an embodiment of the present application, the correcting unit 403 may further estimate a geometric transformation matrix according to the homogeneous coordinates of the detected finder patterns and the alignment patterns. Then, the correcting unit 403 may determine the corrected QR code by using the estimated geometric transformation matrix, thereby mitigating the non-planar geometric distortions caused by the folds of the soft printing substrates.

For n 2D points correspondingly $\{\langle x_i, x'_i \rangle, i=1, 2, \ldots, n\}$, where $x_i$ is the position of a detected pattern, and x' is the corresponding point in the data matrix to be reconstructed. $x_i$ is a homogeneous coordinate representation ($x_i$, $y_i$, $z_i$), wherein $z_i=1$, and each pair of corresponding points gives two linear equations (2) and (3):

$$A_i H = 0 \quad (2)$$

Where H is the transformation matrix to be estimate and $$A_i = \begin{bmatrix} 0^T & -x_i^T & y'_i x_i^T \\ x_i^T & 0^T & -x'_i x_i^T \end{bmatrix} \quad (3)$$

Then, the estimation of H is obtained by minimizing a weighted error sum as below:

$$\underset{H}{\text{minimize}} \sum_{i=1}^{n} w_i \|A_i H\|_2 \quad (5)$$

$$\text{subject to } \|H\|_2 = 1$$

where $w_i$ is the weighting factor of each input point $x_i$. In addition, different weights are given to the finder patterns and alignment patterns. For example, if $x_i$ is from the finder pattern, $w_i=0.6$; otherwise, $w_i=0.4$.

Therefore, the equation (4) is equivalent to the following unconstrained optimization equation:

$$\underset{H}{\text{minimize}} \frac{\|AH\|_2}{\|H\|_2} \quad (4)$$

where A is a matrix built from $\{w_i A_i | i=1, \ldots, n\}$ and each $w_i A_i$ contributes two matrix rows to A. Therefore, the transformation matrix H is estimated by solving the equation (5), so that the QR codes can be corrected accordingly. In this embodiment, all detectable special patterns, including the finder patterns and the internal alignment patterns are used to estimate the geometric transformation matrix. From this, minor shift in the positions of detected patterns and even slightly uneven substrate can be mitigated.

It is determined whether the QR code to be decoded is a monochrome QR code or a color QR code, based on number of layers of the finder patterns and the alignment patterns of the each code. In an embodiment, the number of layers may be read from the finder patterns and alignment patterns for each localized color QR code.

In an embodiment of the present application, the QR code is a monochrome code or a multi-layer code may be checked based on color information randomly sampled from the QR code. If it is determined that the QR code is a monochrome code, the alignment patterns are localized along a diagonal and an anti-diagonal of the QR code except for a bottom-right one. The alignment patterns may or may not be enlarged. The enlarged alignment pattern may be localized on the top of the bottom-right alignment pattern in order to perform a robust geometric transformation on the QR code, which is different from that performed in the prior art. The QR code scanners in the prior art may still detect the original bottom-right pattern and perform the scanning on the same QR code. From the fast checking algorithm of the present application, no time is wasted on selecting a color classifier and performing color recovery when scanning a monochrome QR code.

When images for decoding are captured, the colors of the modules on a color QR code on the image may not be identical to the true colors of the color QR code due to printer configurations, scanning environments, camera hardware, blurring, etc. Therefore, a color classifier may be used to map the color of each pixel on the image to a pre-defined set of colors and then the original colors of the QR code may be acquired and thus the code may be divided into different monochrome QR codes correctly for further decoding. On one hand, if a QR code is determined as a monochrome QR code, there are only two colors between which the chromatic contrast is often high. The restoring unit 404 may restore color (black/white) of the monochrome QR code by using a known dynamic thresholding method.

In particular, the images of QR codes are divided into fix-sized image blocks. For each block, an average illuminance is calculated and a reference threshold of a block is determined by using the average illuminances of that block and the blocks nearby. If the illuminance of a pixel is lower than the reference threshold, the pixel is treated as black; otherwise it is treated as white. On the other hand, the color QR code may consist of 4, 8, 16 or even 32 colors. The restoring unit 404 may restore the colors of the color QR codes by using one or multiple color classifiers that are pre-trained offline. In particular, a machine learning technique, quadratic discriminant analysis (QDA) is used to compute the expected changes in color under different operating conditions and build the color classifiers. It is noted that the color classifier may be obtained by different methods other than the machine learning method QDA and the color classifier may not be constant. There are multiple classifiers and the scanner application will determine which classifier should be used automatically based on the input images. Besides, instead of using one color classifier for recovering each color on a color QR code, the application also provides a more efficient way to do color recovery, which uses different binary Support Vector Machines (SVM) to extract data from different color layers independently. This approach substantially reduces decoding time in mainly two aspects. Firstly, by taking advantages of the structure in the labels, layered SVM only need n binary SVM classifiers for n-layer color QR codes in both training and testing, while the traditional "one-vs-all" SVM requires 2n binary SVM classifiers. Thus, the layered SVM reduces the time needed to perform color recovery by 1−n/2^n (e.g., 67.5% for 3-layer color QR codes) compared to "one-vs-all" SVM. Secondly, this approach also allows the scanner stop using a layer classifier when the corresponding layer is successfully decoded. Hence, it reduces the computational burden and data extraction time when scanning a color QR code.

The decision rule of QDA is given as $G(x) = \text{argmax}_k \delta_k(x)$, where x is a feature vector, k is the class index and $$\delta_k(x) = -\frac{1}{2}\log|\sum_k| - \frac{1}{2}(x-\mu_k)^T \sum_k^{-1}(x-\mu_k) + \log\pi_k \quad (6)$$

In equation (6), parameters $\Sigma_k$, $\mu_k$, and $\pi_k$ of the classifier can be learned off-line by using color data collected exhaustively from real settings of QR code scanning. This avoids unnecessary training computations on mobile devices. In addition, the pixel intensity, namely a RGB triplet, is used as the feature to train the classifier and normalize the feature using the white color estimated from the captured image. For each captured image of a color QR code, the feature of the i-th pixel, $I_i$ is normalized by $$I'_i = \frac{I_i^j}{I_w^j},$$

where $j \in \{1, 2, 3\}$, $I_w$ is the RGB intensities estimated from the white regions in the QR code, e.g., inside each special pattern (such as the finder pattern and alignment pattern), both $I_i$ and $I_w$ are 3-dimensional vectors.

For the color QR codes, each color QR code may be decomposed into a plurality of monochrome QR code, wherein the number of the monochrome QR codes equals to the number of layers.

The decoding unit 405 may extract the user data embedded into each code by using any method for decoding the monochrome QR code to decode the QR codes. The method for decoding the monochrome QR code is known in the art and thus the detailed description thereof is omitted herein. In an embodiment of the present application, the bits in the QR codes are shuffled randomly in a bit-by-bit manner, instead of grouping them byte-by-byte. All the data blocks which are decoded successfully in previous scans may be accumulated until all the data blocks are decoded, i.e., the whole QR code is decoded, thereby increasing the decoding success rate and reducing the scanning latency.

As an example, FIG. 7 illustrates a schematic overview of encoding and decoding an exemplary QR code according to an embodiment of the present application. It is note that although only one 3-layer color QR code is illustrated as an example, the present application is not limited to this. As shown in FIG. 7, the encoding is implemented by first encoding user data into 3 monochrome QR codes with the same dimension firstly, followed by color encoding where a predefined color codebook is used to combine the 3 monochrome QR codes into one color QR code and painting all the finder and alignment patterns into special colors, to facilitate the localizations in decoding. When a color QR code is scanned, the locations of all the alignment patterns and whether they comply with the predefined color constraints (or color codebook) may be checked. For the decoding, after correcting geometric distortion and performing color recovery, the same color codebook during encoding is used to decompose a color QR code into 3 monochrome QR codes and the embedded data are extracted by using the existing method. It is note that the encoding and decoding procedures are illustrative and the present application is not limited to this.

Figure 8:
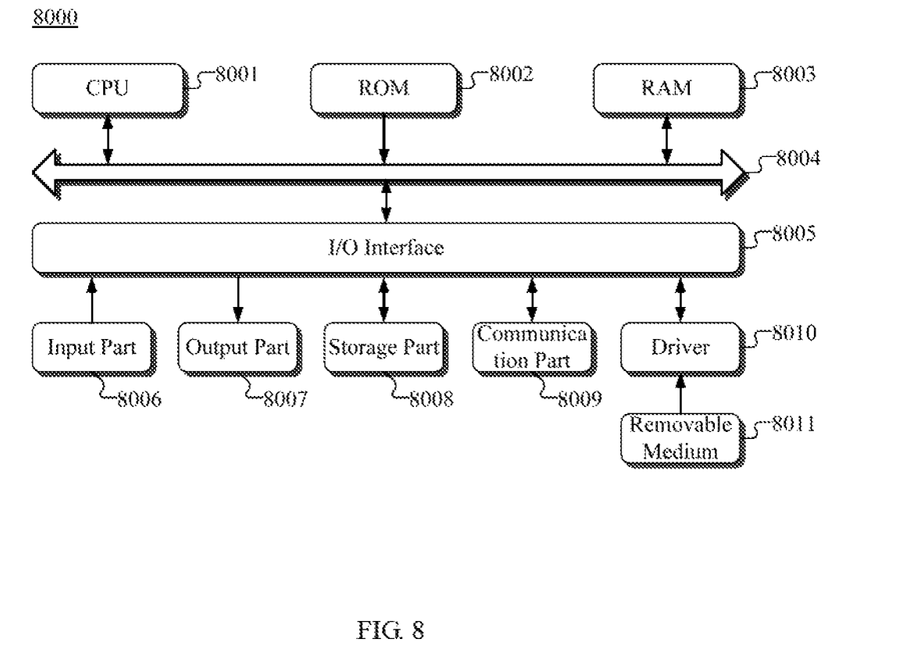
FIG. 8 illustrates a schematic structural diagram of a schematic structural diagram of a computer system that is adapted for implementing the method and the apparatus according to an embodiment of the present application.

Referring now to FIG. 8, a schematic structural diagram of a computer system 8000 that is adapted for implementing the method and the apparatus according to an embodiment of the present application is shown.

As shown in FIG. 8, the computer system 8000 includes a central processing unit (CPU) 8001, which may perform a variety of appropriate actions and processes according to a program stored in a read only memory (ROM) 8002 or a program loaded to a random access memory (RAM) 8003 from a storage part 8008. RAM 8003 also stores various programs and data required by operations of the system 8000. CPU 8001, ROM 8002 and RAM 8003 are connected to each other via a bus 8004. An input/output (I/O) interface 8005 is also connected to the bus 8004.

The following components are connected to the I/O interface 8005: an input part 8006 comprising a keyboard, a mouse and the like, an output part 8007 comprising a cathode ray tube (CRT), a liquid crystal display (LCD), a speaker and the like; the storage part 8008 comprising a hard disk and the like; and a communication part 8009 comprising a network interface card, such as a LAN card, a modem and the like. The communication part 8009 performs communication process via a network, such as the Internet. A driver 8010 is also connected to the I/O interface 8005 as required. A removable medium 8011, such as a magnetic disk, an optical disk, a magneto-optical disk and a semiconductor memory, may be installed onto the driver 8010 as required, so as to install a computer program read therefrom to the storage part 8008 as needed.

In particular, according to the embodiment of the present disclosure, the method described above with reference to FIGS. 2 and 5 may be implemented as a computer software program. For example, the embodiment of the present disclosure includes a computer program product, which includes a computer program that tangibly included in a machine-readable medium. The computer program includes program codes for executing the method in FIGS. 2 and 5. In such embodiments, the computer program may be downloaded from the network via the communication part 8009 and installed, and/or be installed from the removable medium 8011.

The flow charts and the block diagrams in the figures illustrate the system architectures, functions, and operations which may be achieved by the systems, devices, methods, and computer program products according to various embodiments of the present application. For this, each block of the flow charts or the block diagrams may represent a module, a program segment, or a portion of the codes which include one or more executable instructions for implementing the specified logical functions. It should also be noted that, in some alternative implementations, the functions denoted in the blocks may occur in a different sequence from that marked in the figures. For example, two blocks denoted in succession may be performed substantially in parallel, or in an opposite sequence, which depends on the related functions. It should also be noted that each block of the block diagrams and/or the flow charts and the combination thereof may be achieved by a specific system which is based on the hardware and performs the specified functions or operations, or by the combination of the specific hardware and the computer instructions.

The units or modules involved in the embodiments of the present application may be implemented in hardware or software. The described units or modules may also be provided in a processor. The names of these units or modules do not limit the units or modules themselves.

As another aspect, the present application further provides a computer readable storage medium, which may be a computer readable storage medium contained in the device described in the above embodiments; or a computer readable storage medium separately exists rather than being fitted into any terminal apparatus. One or more computer programs may be stored on the computer readable storage medium, and the programs are executed by one or more processors to perform the formula input method described in the present application.

The above description is only the preferred embodiments of the present application and the description of the principles of applied techniques. It will be appreciated by those skilled in the art that, the scope of the claimed solutions as disclosed in the present application are not limited to those consisted of particular combinations of features described above, but should cover other solutions formed by any combination of features from the foregoing or an equivalent thereof without departing from the inventive concepts, for example, a solution formed by replacing one or more features as discussed in the above with one or more features with similar functions disclosed (but not limited to) in the present application.

What is claimed is:

1. A method for decoding a multi-layer color QR code, comprising:

capturing an image of one or more two-dimensional multi-layer color QR codes having a plurality of layers of encoded data;

detecting rough locations of the color QR codes using a sliding-window based QR code detector trained offline;

constructing, within each detected rough location, a corrected color QR code which is generated by using a robust geometric transformation algorithm;

performing color recovery over the corrected color QR code by restoring an original color of each color pixel of the corrected color QR code using a color classifier trained offline and further decomposing the restored color QR code to multiple monochrome QR codes using a predefined color codebook used in an encoding process; and extracting the encoded data from the monochrome QR codes layer by layer and concatenating the monochrome QR codes to output the data encoded in the captured color QR code.

2. The method of claim 1, wherein the constructing of a corrected color QR code comprises:

localizing all spatial patterns including finder patterns and alignment patterns and removing all possible false positives by checking if the locations of the localized spatial patterns comply with color constraints; and performing a robust geometric transformation based on the positions of remained spatial patterns to estimate a geometric transformation matrix by solving a weighted over-determined linear system defined as $$\sum_{i=1}^{n} w_i \|A_i H\|_2$$

where $$A_i = \begin{bmatrix} 0^T & -x_i^T & y_i' x_i^T \\ x_i^T & 0^T & -x_i' x_i^T \end{bmatrix},$$

xi=(xi, yi, 1) is the position of a detected pattern, (xi', yi') is the corresponding point in the data matrix to be reconstructed, wi is the weighting factor of each input point xi, and wi=0.6 if xi is from the finder pattern, wi=0.4 otherwise.

3. The method of claim 1, further comprising:
checking whether the QR code is a monochrome code based on color information randomly sampled from the QR code,
if yes, the localizing further comprises:
localizing the alignment patterns along a diagonal and an anti-diagonal of the QR code except for a bottom-right one; and
localizing an enlarged alignment pattern on a top of the bottom-right alignment pattern in order to perform a robust geometric transformation on the QR code.

4. The method of claim 1, further comprising:
checking whether the QR code is a multi-layer color code based on color information randomly sampled from the QR code,
if yes, the restoring comprises:
restoring the color for each layer of the QR code by using one independent classifier, and
wherein the classifier is selected depending on at least previous scanning results, camera hardware, a number of layers in the QR codes and lighting conditions.

5. The method of claim 1, further comprising:
dividing and shuffling the data modules in each of the QR codes in a bit-by-bit manner, wherein the shuffling is performed randomly or based on a size of data in each QR code.

6. The method of claim 4, further comprising:
training different classifiers for each layer independently, and during a series of scanning, each classifier in different layers also works independently, and stops running once its corresponding layer is successfully decoded.

7. The method of claim 1, further comprising:
combining data in previous scanning attempts to fill in data missed in a current scanning, comprising:
storing partial decoding results from the previous scanning attempts in terms of data blocks;
locating missed data blocks in the current decoding;
checking if the missed data blocks are available in the stored data blocks; and
if yes, filling the missed data blocks by the stored data blocks.

8. The method of claim 1, further comprises:
decoding, in batch, at least one color QR code applied to a fabric including at least a shirt or a pill bag, or an object including a building, a toilet, a road, a bench or a paper.

9. A method for generating a multi-layer color QR code from data to be encoded, comprising:
partitioning the data to be encoded into a plurality of data blocks according to the number of layers and an error correction level of each layer specified by a user;
breaking the data in all the data blocks into bits;
encoding the portioned data blocks into a plurality of monochrome QR codes independently, wherein each monochrome QR code shares a same dimension;
shuffling the data blocks in each monochrome QR code in a bit-by-bit manner randomly or based on sizes of each monochrome QR code;
combining all the monochrome QR codes to generate a multi-layer color QR code using a predefined color codebook; and
adding color constraints to spatial patterns,
wherein the adding of color constraints to spatial patterns comprises: coloring all finder patterns and alignment patterns with a set of color to reduce false positives in a localization process.

10. The method of claim 9, further comprising enlarging the alignment patterns along a diagonal and an anti-diagonal of the monochrome QR code, except the bottom-right one; and
adding an enlarged alignment pattern on the top of the bottom-right alignment pattern to increase decoding robustness of a monochrome QR code with backward compatibility.

11. The method of claim 9, further comprising:
adding an authentication mechanism on the generated color QR code to protect the code, wherein the authentication mechanism is at least implemented by using a secret key and/or a private key; and
applying the generated color QR code to a fabric including at least a shirt or a pill bag, or an object including but not limited to a building, a toilet, a road, a bench or a paper.

12. A CQR-BinaryCode comprising a multi-layer color QR code generated by the method of claim 9,
wherein private and/or encrypted binary data in the CQR-BinaryCode are transmitted via non-digital medium.

13. A cloth comprising a multi-layer color QR code generated by the method of claim 9, wherein the QR code is applied to a cloth for storing encrypted information, the information is protected by a single password or multiple passwords, such that people with different passwords will get different information from the same QR code, the cloth is applied in mass event to identify event staffs by scanning the QR codes on their clothes, and the event staffs perform registrations by reading QR codes of individuals from a crowd photo.

14. A cloth comprising a multi-layer color QR code generated by the method of claim 9, wherein the QR code is applied to a cloth for storing encrypted information, the information is protected by a single password or multiple passwords, such that people with different passwords will get different information from the same QR code, the cloth is implemented as a data card on a cloth of people with memory impairment to help them find a way home or contact their relatives by scanning the color QR code.

15. A CQR-Assistant comprising a multi-layer color QR code generated by the method of claim 9, wherein the QR code is applied to a pill bag for providing pill-taking information in multi-media voice and/or text format, the pill-taking information is shown from the QR code via a non-textual manner including voices or texts with adjustable font sizes to allow people with difficulty to read/access the information on drug bag to get the pill-taking information.

16. A CQR-Assistant comprising a multi-layer color QR code generated by the method of claim 9, wherein the QR code is applied to a pill bag for providing pill-taking information in multi-media voice and/or text format, a scanner algorithm detects finder and alignment patterns on the QR code to transform an image of the drug to create an elevation drawing; and what type of the drug putted on the QR code is recognized to allow patients to check whether the drugs are correct before taking.

17. A CQR-Assistant comprising a multi-layer color QR code generated by the method of claim 9, wherein the QR code is applied to a pill bag for providing pill-taking information in multi-media voice and/or text format, drug information read from the background QR code and whether it matches the scanned drug is checked.

18. A CQR-Eye comprising a multi-layer color QR code generated by the method of claim 9, wherein the QR code gathering information including visual information regarding nearby objects and delivering the information by non-visual channels, the QR codes are attached on a surface of different physical objects including a building, a toilet, a road and a bench and are scanned in an aim-free manner.

19. A CQR-Eye comprising a multi-layer color QR code generated by the method of claim 9, wherein the QR code gathering information including visual information regarding nearby objects and delivering the information by non-visual channels, the data in the QR codes are not forgeable by digital signatures, and wherein information filters are provided and set by a user for filtering out uninterested information in the QR codes by using tags embedded in the QR codes.

20. A computer-implemented method for recommending feasible setting parameters in generation of a multi-layer QR code from a predetermined set of setting parameters on a computer comprising a processor, the method comprising:
retrieving, using the processor, requirement parameters from a user, comprising a data size, a limit printout size, a printing resolution, and a lighting condition; and
determining, using the processor, from the predetermined set of setting parameters, recommended feasible setting parameters using the retrieved requirement parameters and a preset condition as input, so that the QR code is generated in consideration of the determined feasible setting parameters.

21. The method of claim 20, wherein the determining is implemented by minimizing, using the processor, a scanning time during which the QR code is scanned by a rule of $$\min_i x_5^i$$
$$\text{subjec to } x^i \in \Omega$$
$$x_1^i \geq m_1$$
$$x_2^i \leq m_2$$
$$x_3^i = m_3$$
$$x_4^i = m_4$$

where $m_1$, $m_2$, $m_3$, and $m_4$ represent, respectively, the data size, the limit printout size, the printing resolution, and the lighting condition in the requirement parameters; and)
$\Omega$ represents the predetermined set of setting parameters, $x^i = (x_1^i, x_2^i, x_3^i, x_4^i, x_5^i, \ldots) \in \Omega$, where $i=1, \ldots n$, and n is the number of setting parameters in $\Omega$, $x_1^i$, $x_2^i$, $x_3^i$, $x_4^i$, and $x_5^i$ represent the feasible data size, the feasible limit printout size, the feasible printing resolution, the feasible lighting condition, and the scanning time, respectively; and
$x_k^i$, $k=6, \ldots j$ represents the number of layers in the QR code, error correction of each layers or a decoding time.

22. The method of claim 21, wherein if no feasible setting parameter is determined, the determining is implemented by a rule of $$\min_i D(x^i, m) + \lambda x_5^i$$
$$\text{subjec to } x^i \in \Omega$$
$$x_1^i \geq m_1$$
$$D(x, m) := \alpha_1 \max(0, x_2 - m_2) + \alpha_2 1_{x_3 = m_3} + \alpha_3 1_{x_4 = m_4}.$$

where $1_p = 1$ if p is true, $1_p = 0$ otherwise,
$\alpha_1$, $\alpha_2$, and $\alpha_3$ represent weights on different dimension; and $\lambda$ represents the weight of scanning time when determining a feasible setting parameter.

23. An apparatus for decoding a multi-layer color QR code, comprising:
a processor; and
a memory;
the memory storing computer-readable instructions which when executed by the processor, cause the processor to:
capture an image of one or more two-dimensional multi-layer color QR codes having a plurality of layers of encoded data;
detect rough locations of the color QR codes using a sliding-window based QR code detector trained offline;
construct, within each detected rough location, a corrected color QR code which is generated by using a robust geometric transformation algorithm;
perform color recovery over the corrected color QR code by restoring an original color of each color pixel of the corrected color QR code using a color classifier trained offline and further decomposing the restored color QR code to multiple monochrome QR codes using a predefined color codebook used in an encoding process; and
extract the encoded data from the monochrome QR codes layer by layer and concatenating the monochrome QR codes to output the data encoded in the captured color QR code.

24. The apparatus of claim 23, wherein the processor is further configured to:
localize all spatial patterns including finder patterns and alignment patterns and remove all possible false positives by checking if the locations of the localized spatial patterns comply with the color constraints; and
perform a robust geometric transformation based on the positions of remained spatial patterns to estimate a geometric transformation matrix by solving a weighted over-determined linear system defined as $$\sum_{i=1}^{n} w_i \|A_i H\|_2$$

where $$A_i = \begin{bmatrix} 0^T & -x_i^T & y_i' x_i^T \\ x_i^T & 0^T & -x_i' x_i^T \end{bmatrix},$$

$x_i = (x_i, y_i, 1)$ is the position of a detected pattern, $(x_i', y_i')$ is the corresponding point in the data matrix to be reconstructed, $w_i$ is the weighting factor of each input point $x_i$, and $w_i = 0.6$ if $x_i$ is from the finder pattern, $w_i = 0.4$ otherwise.

25. The apparatus of claim 23, wherein the processor is further configured to combine data in previous scanning attempts to fill in data missed in a current scanning, which is implemented by:
storing partial decoding results from the previous scanning attempts in terms of data blocks;
locating missed data blocks in the current decoding;
checking if the missed data blocks are available in the stored data blocks; and
if yes, filling the missed data blocks by the stored data blocks.

26. The apparatus of claim 25, wherein the processor is further configured to train different classifiers for each layer independently and during a series of scanning, each classifier in different layers also works independently, and stops running once its corresponding layer is successfully decoded.

27. An apparatus for generating a multi-layer color QR code from data to be encoded, comprising:
a processor; and
a memory;
the memory storing computer-readable instructions which when executed by the processor, cause the processor to perform operations, the operations comprising:
partitioning the data to be encoded into a plurality of data blocks according to the number of layers and an error correction level of each layer specified by a user;
breaking the data in all the data blocks into bits;
encoding the portioned data blocks into a plurality of monochrome QR codes independently, wherein each monochrome QR code shares a same dimension;
shuffling the data blocks in each monochrome QR code in a bit-by-bit manner randomly or based on sizes of each monochrome QR code;
combining all the monochrome QR codes to generate a multi-layer color QR code using a predefined color codebook; and
adding color constraints to spatial patterns,
wherein the adding of color constraints to spatial patterns comprises: coloring all finder patterns and alignment patterns with a set of color to reduce false positives in a localization process.

28. The apparatus of claim 27, wherein the operations further comprise:
enlarging the alignment patterns along a diagonal and an anti-diagonal of the monochrome QR code, except the bottom-right one; and
adding an enlarged alignment pattern on the top of the bottom-right alignment pattern to increase decoding robustness of a monochrome QR code with backward compatibility.

29. The apparatus of claim 27, wherein the operations further comprise:
adding an authentication mechanism on the generated color QR code to protect the code, wherein the authentication mechanism is at least implemented by using a secret key and/or a private key; and
applying the generated color QR code to a fabric including at least a shirt or a pill bag, or an object including but not limited to a building, a toilet, a road, a bench or a paper.

* * * * *